United States Patent
Arakawa et al.

(10) Patent No.: US 6,636,476 B1
(45) Date of Patent: Oct. 21, 2003

(54) OPTICAL RECORDING MEDIUM WITH A SUBSTRATE OF TWO DIFFERENT RESIN LAYERS

(75) Inventors: Nobuyuki Arakawa, Kanagawa (JP); Yuji Akiyama, Tokyo (JP); Toshiyuki Kashiwagi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/219,767

(22) Filed: Dec. 23, 1998

(30) Foreign Application Priority Data

Dec. 26, 1997 (JP) .............................. 9-361069

(51) Int. Cl.⁷ .............................. G11B 3/70; G11B 7/24
(52) U.S. Cl. .................... 369/283; 369/275.2; 428/64.2
(58) Field of Search ................................. 369/284, 282, 369/275.2, 283, 288, 13.38, 13.39, 13.4, 13.53, 286; 428/195, 216, 315.5, 315.7, 913, 64.1, 914, 64.2, 423.17; 430/944, 269, 201, 945, 270.11, 270.13; 264/106, 1.3; 283/107

(56) References Cited

U.S. PATENT DOCUMENTS 4,377,616 A * 3/1983 Ashcraft et al. ............ 428/213
4,879,082 A * 11/1989 Kudo et al. ................. 264/106
5,474,873 A * 12/1995 Akamatsu et al. ........ 430/273.1
5,527,661 A * 6/1996 Akahira et al. ............. 369/284
5,576,268 A * 11/1996 Burberry et al. ............ 428/195
5,591,500 A * 1/1997 Kawanishi ................. 428/64.1
5,817,389 A * 10/1998 Ono ......................... 428/64.1
5,889,756 A * 3/1999 Ichihara et al. .......... 369/275.2
6,096,431 A * 8/2000 Matsudaira et al. ....... 428/423.7
6,165,578 A * 12/2000 Ohno et al. ................ 369/288

FOREIGN PATENT DOCUMENTS

JP          06-134805       *  5/1994

* cited by examiner

Primary Examiner—William Korzuch
Assistant Examiner—Kim-Kwok Chu
(74) Attorney, Agent, or Firm—Rader, Fishman & Grauer PLLC; Ronald P. Kananen

(57) ABSTRACT

An optical disc includes a substrate, and a recording layer and transparent layer formed in this order on the substrate. A light is incident from the transparent layer to write and/or read an information signal. The substrate comprises a first resin layer forming a surface of the substrate on which the recording layer is formed, and a second resin layer having a higher flexural modulus is formed on the first resin layer.

27 Claims, 11 Drawing Sheets

OPTICAL RECORDING MEDIUM WITH A SUBSTRATE OF TWO DIFFERENT RESIN LAYERS

BACKGROUND OF THE INVENTION

1. Field of the Invention

The present invention relates to an optical recording medium comprising a substrate, and at least a recording layer and light-transparent layer formed on the substrate, and a method of manufacturing the optical recording medium. More particularly, the present invention concerns an optical recording medium having a multilayered substrate structure contributing to an improved strength and durability and also capable of recording data with a high density, and a method of manufacturing the optical recording medium.

2. Description of Related Art

Optical and magnetic recording media are widely used to record various kinds of information such as audio, video and other information. More particularly, they are generally classified into an optical disc in which information signals are previously written in the form of embossed pits, a phase-change optical disc in which information signals are written utilizing the phase change of its recording layer, a magnetooptic optic in which information signals are written utilizing the magneto-optical effect of its recording layer, and a magnetic disc in which information signals are magnetically written.

These disc-like recording media use a resin-made substrate in which phase pits, pre-grooves, and so forth are formed as data, tracking signals, and so forth in the form of delicate grooves and lands.

Conventionally, such a resin-made disc substrate is molded using an injection mold as shown in FIG. 1. FIG. 1 is a sectional view of the injection mold.

The injection mold is generally indicated with a reference 100. It consists essentially of a fixed mold 101a to form one of the main surfaces of a disc substrate, a movable mold 101b disposed opposite to the fixed mold 101a to form the other main surface of the disc substrate, and a mold 112 to form a periphery of the disc substrate. The fixed mold 101a and movable mold 101b are provided each with a stamper having formed thereon grooves and lands corresponding to a desired groove/land pattern indicative of information signals, and so forth.

The movable mold 101b is moved toward and away from the fixed mold 101a by a driving mechanism (not shown). When clamped together, the fixed mold 101a, movable mold 101b and peripheral mold 112 define together a cavity 111.

The fixed mold 101a has provided therein and positioned in the center of the cavity 111 a nozzle 114 to fill, by injection, the cavity 111 with a molten synthetic resin into the cavity.

In the injection mold 100 having the above configuration, the movable mold 101b is first moved toward the fixed mold 101a (clamping) by the driving mechanism (not shown) to define the cavity 111. Next, the molten synthetic resin is filled into the cavity 111 by injection through the nozzle 114.

Then, the injected synthetic resin is cooled by a thermoregulator (not shown) to a slush state. The movable mold 101b has a first ejecting member 116 disposed therein. A punch 117 is thrust from the central hole of the ejecting member 116 toward the fixed mold 101a to make a hole which will be a center hole in a disc substrate. Thereafter, in the injection mold 100, the injected synthetic resin is hardened by cooling by the thermoregulator (not shown).

Then, in this injection mold 100, the movable mold 101b is moved away from the fixed mold 101a (mold opening) by the driving mechanism (not shown). Finally, the disc substrate formed in the cavity 111 is taken out by a stripping mechanism (not shown).

Thereafter, a recording layer, reflective layer, protective layer, and so forth for example, are formed on the resin-made disc substrate thus molded to produce an optical disc.

However, the above-mentioned injection molding used to produce an optical disc is disadvantageous in that at the step in which a molten resin is filled, by injection, in the injection mold, a change of the injecting pressure, change of the injecting temperature and a friction between the molten resin and mold will cause stresses in the molten resin in the cavity.

More particularly, such stresses will take place at the following steps. First, during injection of the molten resin into the injection mold 100, the molten resin injected in the cavity 111 will flow to cause a shear stress. Next, when the injection of the molten resin into the cavity 111 is complete, a screw (not shown) for injecting the resin abruptly stops moving and also the molten resin stops flowing abruptly. Thus their respective inertia will take place as stress. Also in the process up to gate sealing for injection of the molten resin, the molten resin is pressurized to prevent the molten resin from flowing and a sink from taking place due to a volumetric shrink of the molten resin. An uneven pressure distribution in the entire disc substrate will result in a stress. Especially when cooling to harden the molten resin, an uneven temperature distribution will take place in an outer portion 120a (see FIG. 2) of the molten resin in contact with the fixed mold 101a and movable mold 101b as well as in an inner portion 120b (also see FIG. 2) not in contact with the molds, thus causing a stress.

A part of such stresses will be partially relaxed in the process until the molten resin is cooled and hardened in the mold, but the majority will reside, not relaxed, as a residual stress in the molded disc substrate.

As a result, the molded disc substrate 120 will be subject to deformations such as partial warpage 121 and sink 122 and an uneven distribution of birefringence or double refraction as shown in FIG. 2.

The disc substrate molded from a resin by injection molding is unavoidably shrunk in the molding process, especially at the cooling step. More particularly, the shrinkage is different in the outer periphery from in the inner periphery of the disc substrate in many cases. The outer periphery of a disc substrate 130 warps, resulting in a dish-like deformation as shown in FIG. 3.

Thus, to minimize the deformation of the disc substrates 120 and 130, it is required for the conventional injection molding that mold clamping should be done with a reduced force and injection be made at a slower speed to reduce the packing rate, thereby reducing the pressure inside the resin. However, such measures taken in the conventional injection molding for manufacture of disc substrates are very troublesome but cannot practically attain any completion elimination of the deformation of the disc substrates 120 and 130.

Because of such deformation of the disc substrates 120 and 130, a predetermined land/groove pattern cannot be formed on the disc substrates 120 and 130 with a high accuracy but the disc substrate 120 incurs a poor stamping 123 of the land/groove pattern as shown in FIG. 4. As the result, the optical disc produced using such disc substrate 120 or 130 is disadvantageous in that its signal characteristic is not satisfactory.

The recording density of an optical disc depends upon a diameter of a laser spot focused on a recording layer of the optical disc. That is, the smaller the laser spot diameter, the higher the recording density is. The laser spot diameter is proportional to a product $\lambda/NA$ ($\lambda$: laser wavelength and NA: numerical aperture) of a reading/writing optical system. For an increased recording density in an optical disc, it is necessary that a laser having a shorter wavelength $\lambda$ and an objective lens having an increased numerical aperture NA should be used.

However, such an increased NA of the objective lens will raise a problem of coma aberration because the coma is proportional to ([skew angle]$\times NA^3 \times$[optical disc thickness through which a laser light passes]). To cope with this coma problem, it has been proposed to reduce the thickness of the transparent substrate for optical disc.

Normally, however, there is a relationship that the strength of an optical disc is proportional to a cube of the thickness of the disc. A conventional optical disc including a substrate of which the thickness is reduced for an increased recording density is disadvantageous in that the mechanical properties such as bending strength, and so forth are inferior and a bimetallic deformation is very easily arisen due to a moisture absorption, and so forth in addition to the aforementioned stresses.

SUMMARY OF THE INVENTION

It is therefore an object of the present invention to overcome the above drawbacks of the prior art by providing an optical recording medium having a sufficient strength and durability without deformations such as warpage, sink, and so forth and capable of recording data with a high density, and a method of manufacturing the optical recording medium.

According to the present invention, there is provided an optical recording medium including a substrate, and a recording layer and transparent layer formed in this order on the substrate, a light being incident from the transparent layer to write and/or read information signal, the substrate comprising:

a first resin layer forming a surface of the substrate on which the recording layer is formed; and a second resin layer formed on the first resin layer from a resin having a higher flexural modulus than that of the resin of the first resin layer.

In the optical recording medium having the above-mentioned structure according to the present invention, the substrate is comprised of the first resin layer forming the surface of the substrate on which the recording layer is formed, and the second resin layer formed from the resin having the higher flexural modulus, namely, a higher rigidity, than the resin of the first resin layer. Therefore, the substrate has an increased strength to minimize the deformation of the substrate. As the result, the optical recording medium according to the present invention is enhanced in strength, thus hardly subject to deformations such as warpage, sink, and so forth and has an outstanding durability. Since in this optical recording medium according to the present invention, a laser light is incident from the transparent layer side, the structure of the substrate composed of the first and second resin layers will not adversely affect the optical writing and/or reading.

Further, the first resin layer forming the surface of the substrate on which the recording layer is formed is formed from the resin having the smaller rigidity, namely, a better fluidity, than the second resin layer. Therefore, the first resin layer has an excellent stampability, and thus the substrate has a superior stampability.

According to the present invention, there is provided a method of manufacturing, by injection molding, an optical recording medium including a substrate, and a recording layer and transparent layer formed in this order on the substrate, a light being incident from the transparent layer to write and/or read information signal.

In the optical recording medium manufacturing method according to the present invention, the substrate is formed by two-color molding steps of forming a first resin layer at least on a side of the substrate on which the recording layer is formed, and a second resin layer on the first resin layer from a resin having a higher flexural modulus than the resin of the first resin layer.

In the optical recording medium manufacturing method according to the present invention, the substrate is formed by forming, by the two-color molding, the first resin layer on the surface of the substrate on which the recording layer is formed, and the second resin layer formed from the resin having the higher flexural modulus, namely, a higher rigidity, than the resin of the first resin layer. Therefore, the substrate has an increased strength to minimize the deformation of the substrate. As the result, the method according to the present invention can be used to manufacture an optical recording medium enhanced in strength, thus hardly subject to deformations such as warpage, sink, and so forth and having an outstanding durability.

Further, in the method according to the present invention, the first resin layer forming the surface of the substrate on which the recording layer is formed is formed, from the resin having the smaller rigidity, namely, a better fluidity, than the second resin layer. Therefore, the first resin layer has an excellent stampability, and thus the substrate has a superior stampability.

DETAILED DESCRIPTION OF THE PREFERRED EMBODIMENTS

It should be noted that the optical disc according to the present invention may be a read-only one having a reflective metal layer formed on a substrate on which pits corresponding to information are formed, the pits and reflective metal layer forming together a signal recording layer of the optical disc.

Figure 1:
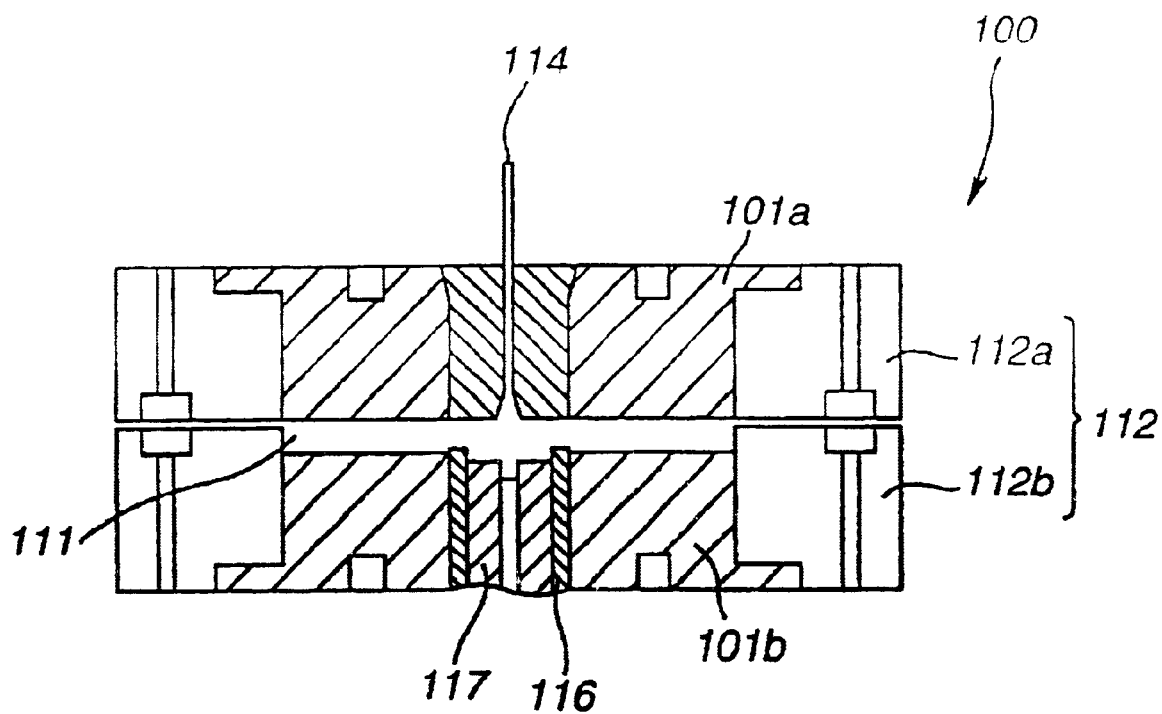
FIG. 1 is a sectional view of an injection mold used for forming a conventional disc substrate.
Figure 2:
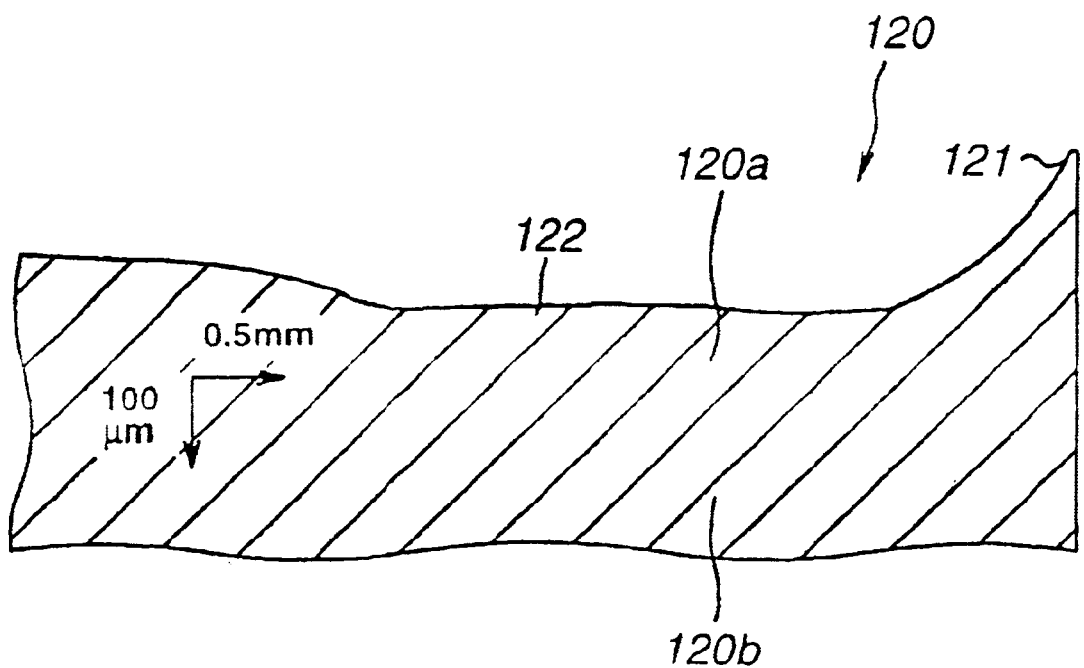
FIG. 2 is a sectional view, enlarged in scale, of an example of conventional injection mold.
Figure 3:
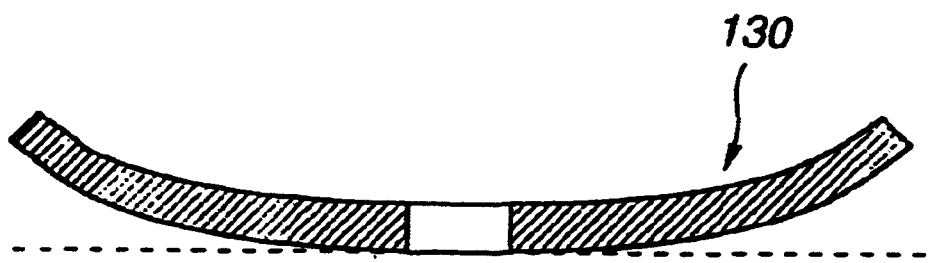
FIG. 3 is a sectional view, enlarged in scale, of an example of conventional disc substrate.
Figure 4:
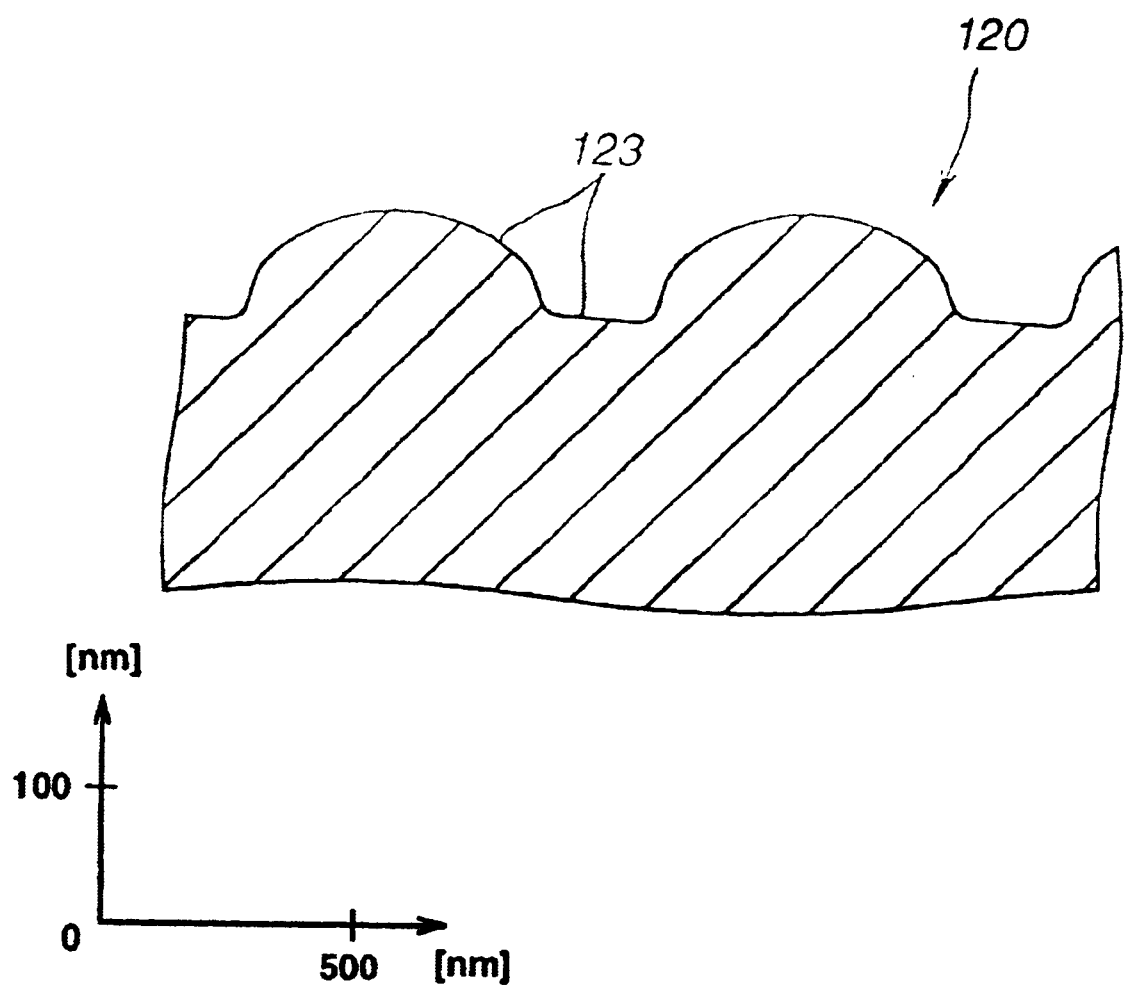
FIG. 4 is a sectional view, enlarged in scale, of another example of conventional disc substrate.
Figure 5:
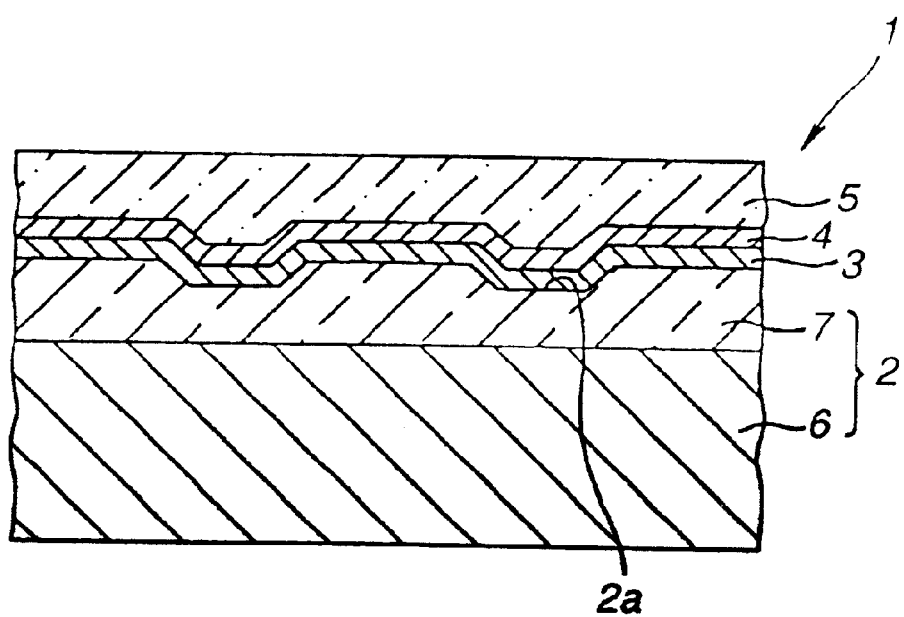
FIG. 5 is a sectional view of an embodiment of optical disc according to the present invention.

FIG. 5 is a sectional view of an embodiment of optical disc as an optical recording medium according to the present invention.

As shown in FIG. 5, the optical disc 1 comprises a substrate 2 having pre-grooves 2a formed thereon, a reflective layer 3, recording layer 4 and a transparent layer 5 formed in this order on the substrate 2.

The substrate 2 includes a core layer 6 and skin layer 7, formed from resins different in flexural modulus from each other, respectively.

The skin layer 7 is provided on a side of the substrate 2 on which the recording layer 4 is formed, namely, on the signal recording surface of the optical disc 1. It is formed on the core layer 6. The skin layer 7 has formed thereon phase pits for data information, tracking servo signal, and so forth and pre-grooves 2a having a predetermined pattern of delicate pits and lands formed therein. The skin layer 7 should preferably have a thickness of 100 $\mu$m or more.

The skin layer 7 is formed from a material having a good fluidity. Therefore, the skin layer 7 has such an excellent stampability that the predetermined pattern of pits and lands can be formed with a high accuracy. More particularly, the skin layer 7 is formed from a synthetic resin such as polycarbonate or ZEONEX (thermoplastic olefin resin by Nihon Zeon).

The core layer 6 is formed on a side of the substrate 2 opposite to the signal recording surface and has the skin layer 7 disposed on the surface thereof. The resin of the core layer 6 has a higher flexural modulus than the resin of the skin layer 7. Therefore, the core layer 6 has a higher hardness, namely, a higher rigidity, than the skin layer 7.

The resin of the core layer 6 may be a highly rigid one prepared by adding to a commonly used resin a heterogeneous resin, fibers, fillers or the like to increase the hardness of the resin. More particularly, the resin for this core layer 6 should desirably be a one having a flexural modulus of 29,000 kgf/cm$^2$ or more, and preferably of 34,000 kgf/cm$^2$ or more. For example, the resin may be a one which additionally contain a talc powder, mica powder, carbon fibers or the like. The core layer 6 should have a thickness equal to 50% or more of that of the entire substrate, and preferably of 70%.

In the optical disc 1 of the present invention, the skin layer 7 and hard core layer 6 forming together the substrate 2 contribute to an increased strength of the substrate 2. Thus, the substrate 2 can be extremely restrained from being subjected to deformations such as warpage, sink, and so forth. Therefore, the optical disc 1 according to the present invention has an enhanced strength and is little subjected to deformations such as warpage, sink, and so forth. Thus, the optical disc 1 is oustandingly durable in strict conditions in the manufacturing process as well as in operating ambient conditions, and thus has a high reliability.

Also, since the skin layer 7 having an excellent stampability is used in the substrate 2, the optical disc 2 having the substrate 2 can have stamped thereon with a high accuracy a predetermined pattern of pits and lands corresponding to information signals, and so forth. Namely, the optical disc 1 has an excellent stampability and thus it is capable of recording information with a further increased density. It will thus have superior writing and reading characteristics.

Furthermore, because of the excellent durability, the optical disc 1 is little subjected to deformations caused by the conditions at manufacturing site and operating ambient conditions. Thus, it is not necessary to forming on a to-be-read surface other than the signal recording surface a translucent layer, moisture-proof sheet or the like through which light can pass, in order to prevent the optical disc from being deformed, as in the case of the conventional optical discs. Therefore, the optical disc 1 according to the present invention can be manufactured more easily and efficiently than the conventional optical discs, so that the manufacturing process can be simplified and the optical disc 1 can be produced with an improved yield percentage.

Also, the optical disc 1 according to the present invention is designed so that information signal is written and/or read with a laser light incident from the transparent layer 5. Thus, the optical write and/or read are not influenced by the double-layer structure of the substrate 2 consisting of the skin layer 7 and core layer 6. On the contrary, the conventional optical discs such as compact disc (CD), digital versatile or video disc (DVD), and so forth are designed so that an information signal is written and/or read with a laser light incident from a disc substrate which is transparent. Therefore, the disc substrate must be of a uniform optical structure and thus cannot be multilayered as in the case of the two-layered substrate 2 of the optical disc according to the present invention.

Thus, according to the present invention, the disc substrate 2 having a marble or mottle pattern can be produced by the two-color molding using different resins for the skin and core layers 7 and 6, respectively.

Note that the reflective layer 3 is formed on one main surface 6a of the substrate 2 on which the pre-grooves 2a are formed. The reflective layer 3 reflects a light having passed through the recording layer 4 while serving as a heat sink to prevent heat confined excessively in the recording layer 4.

The reflective layer 3 should desirably be formed from a metal element, semi-metal element, semiconductor element or their compound singly or in combination.

The reflective layer 3 should preferably be formed from a material containing Si in 0.4–0.8% by weight, Fe in 0.7% or less by weight, Cu in 0.15–0.40% by weight, Mn in 0.15% or less by weight, Mg in 0.8–1.2% by weight, Cr in 0.04–0.35% by weight, Zn in 0.25% or less by weight, Ti in 0.15% or less by weight and Al as remainder (base material). When this material is used, the reflective layer 3 is formed to have a thickness of 50 to 200 nm.

The reason for the above content of the material is that a phase-change recording layer 4 formed on the reflective layer 3 will hardly be influenced by a crystalline structure of the reflective layer 3 and an interfacial shape defined by the material grain size of the reflective layer 3. Thus, the recording layer 4 will accurately reflect the surface shape of the substrate 2.

Further, the reflective layer 3 is formed from the above-mentioned material on the substrate 2 by ion beam sputtering, DC sputtering or RF sputtering, of which the ion beam sputtering method should preferably be adopted.

The recording layer 4 is an optical recording layer to or from which an information signal can be written or erased by irradiation of a laser light. The recording layer is a layer of a phase-change material showing a reversible change between a crystalline phase and an amorphous phase, a magneto-optically recording layer which loses the coercive force when its temperature rises above the Curie temperature and shows a reversal of magnetization in the direction of external magnetic field, or the like.

The phase-change layer is formed from a simple calcogen or a calcogen compound. More particularly, the simple calcogen is Te or Se, and the calcogen compound is a calcogenite material such as Ge—Sb—Te, Ge—Te, In—Sb—Te, In—Se—Te—Ag, In—Se, In—Se—TI—Co, In—Sb—Se, $Bi_2Te_3$, BiSe, $Sb_2Se_3$ or $Sb_2Te_3$.

The magneto-optically recording layer is formed from a vertically magnetized film having a magnetooptic characteristic such as Kerr Effect, or Faraday Effect, including an amorphous alloy film of Tb—Fe—Co or the like.

The transparent layer 5 is formed on the recording layer 4. For writing and/or reading information signal or the like into the optical disc 1, a laser light is irradiated onto the transparent layer 5. The laser light having passed through this transparent layer 5 is incident upon the recording layer 4 to write and/or read the information signal. Also the transparent layer 5 protects the reflective layer 3 and recording layer 4 from external shock, and also serves to prevent the layers 3 and 4 from getting into contact with an corrosive factor such as moisture or the like.

The transparent layer 5 is formed from a material through which the laser light can be transmitted. For example, the transparent layer 5 is formed by applying an ultraviolet-curable resin to the recording layer 4 by spin-coating or other method and irradiating ultraviolet rays to the resin applied to the recording layer 4. It should be appreciated that the transparent layer 5 may be formed by bonding to the recording layer 4, with a transparent adhesive such as ultraviolet-curable resin or the like, a transparent sheet of glass or an acrylic resin, polyolefinic resin or the like, for example.

The transparent layer 5 has a limited thickness of 0.3 mm or less because this layer thickness can considerably suppress a coma aberration taking place due to a tilt of the optical even if the numerical aperture (NA) of an objective lens included in the writing and/reading optical system is increased up to 0.8.

The basic configuration of the optical disc 1 according to the present invention has been described in the foregoing. It will be appreciated, however, that in addition to the layers included in the optical disc 1, dielectric layers may be provided to control the optical and thermal characteristics of the optical disc 1. In this case, the reflective layer 3, first dielectric layer, recording layer 4, second dielectric layer, and the transparent layer 5 are formed in this order on the substrate 2. In the optical disc of this construction, a cross protection between the recording layer 4, reflective layer 3 and dielectric layers will control the optical characteristics such as reflectivity, and especially the reflective layer 3 and second dielectric layer will control the thermal characteristic.

Figure 6:
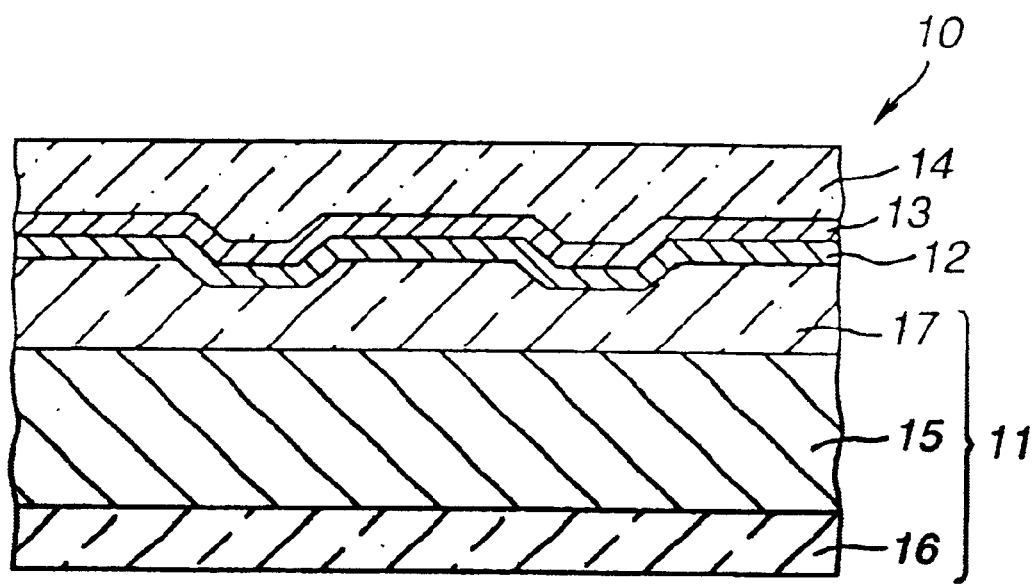
FIG. 6 is a sectional view of another embodiment of optical disc according to the present invention.

In the foregoing, an optical disc having the two-layered substrate 2 (will be referred to as "two-layered optical disc" hereinunder) has been described as an embodiment of the optical disc according to the present invention. However, it should be noted that the present invention can provide an optical disc having a substrate consisting of two skin layers provided at opposite sides of the substrate and a core layer provided between the skin layers as shown in FIG. 6. FIG. 6 is a sectional view showing another embodiment of the optical disc according to the present invention.

An optical disc according to the second embodiment of the present invention is generally indicated with a reference 10 in FIG. 6. It is composed of a substrate 11 and a reflective layer 12, recording layer 13 and a transparent later 14 formed in this order on a substrate 11.

The substrate 11 is comprised of a core layer 15 formed from the aforementioned material, and skin layers 16 and 17 formed on the opposing sides of the core layer 15.

It should be noted that the reflective layer 12, recording layer 13 and transparent layer 14 in this optical disc 10 are similar to those in the optical disc 1 having been described with reference to FIG. 5.

The optical disc 10 has the substrate 11 consisting of the highly hard core layer 15 and the skin layers 16 and 17 having an excellent stampability and provided on the opposite sides of the core layer 15 (this optical disc will be referred to as "sandwich type optical disc" hereinunder). The increased strength of the substrate 11 and the same nature of the skin layers 16 and 17 provided on the opposite sides of the substrate 11 contribute to more effective prevention of the substrate 11 from being warped and sunk as well as to a high reliability of the optical disc 10.

Figure 7:
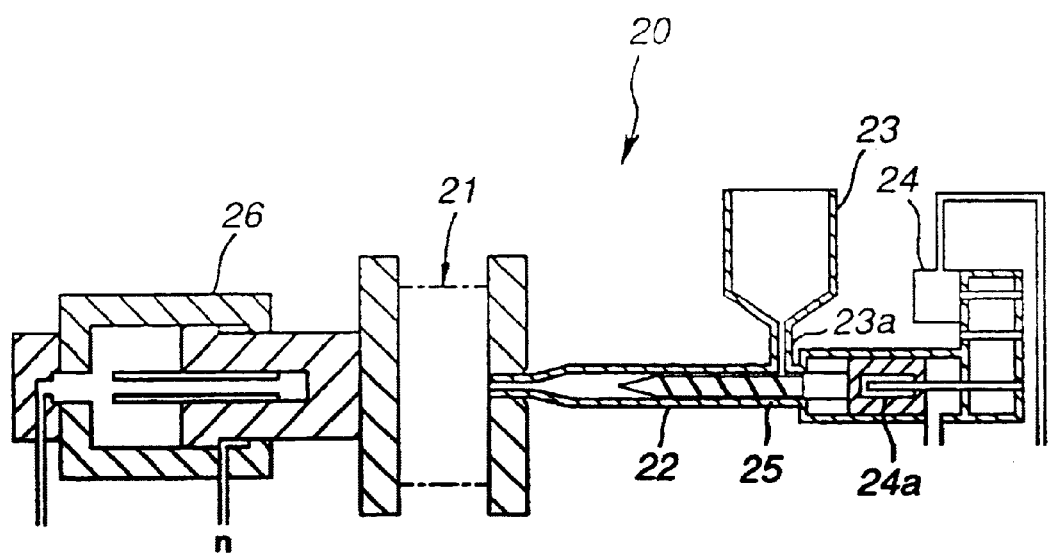
FIG. 7 is a sectional view of an embodiment of injection molding machine.

Next, the method of manufacturing the two-layered optical disc shown in FIG. 5 will be described. An injection molding machine used for manufacture of the substrate of the two-layered optical disc shown in FIG. 5 will be described with reference to FIG. 7. FIG. 7 is a sectional view of that injection molding machine for injection-molding of the disc substrate 2.

In FIG. 7, the injection molding machine is generally indicated with a reference 20. The injection molding machine 20 includes a mold 21 which is clamped and filled with a molten resin to mold the molten resin, a heating cylinder 22 connected to an inlet provided on the mold 21 to fill, by injection, the molten resin into the mold 21, a hopper 23 connected to the heating cylinder 22 and into which a resin is introduced, a hydraulic motor 24 to drive a screw 25, and a clamping cylinder 26 to open and close the mold 21.

The hopper 23 has a generally cylindrical shape and is provided with a material inlet 23a for connection to the heating cylinder 22.

The screw 25 is provided in the heating cylinder 22, connected to the hydraulic motor 24 and driven to rotate by the latter. A heater (not shown) is provided around the heating cylinder 22. In the heating cylinder 22, a resin introduced in the hopper 23 is kneaded by the screw 25 and fed along the groove of the screw 25 to the end of the heating cylinder 22 while being heated by the heater.

The hydraulic motor 24 is connected to the screw 25 by means of a hydraulic cylinder 24a. The hydraulic motor 24 drives the screw 25.

Figure 8:
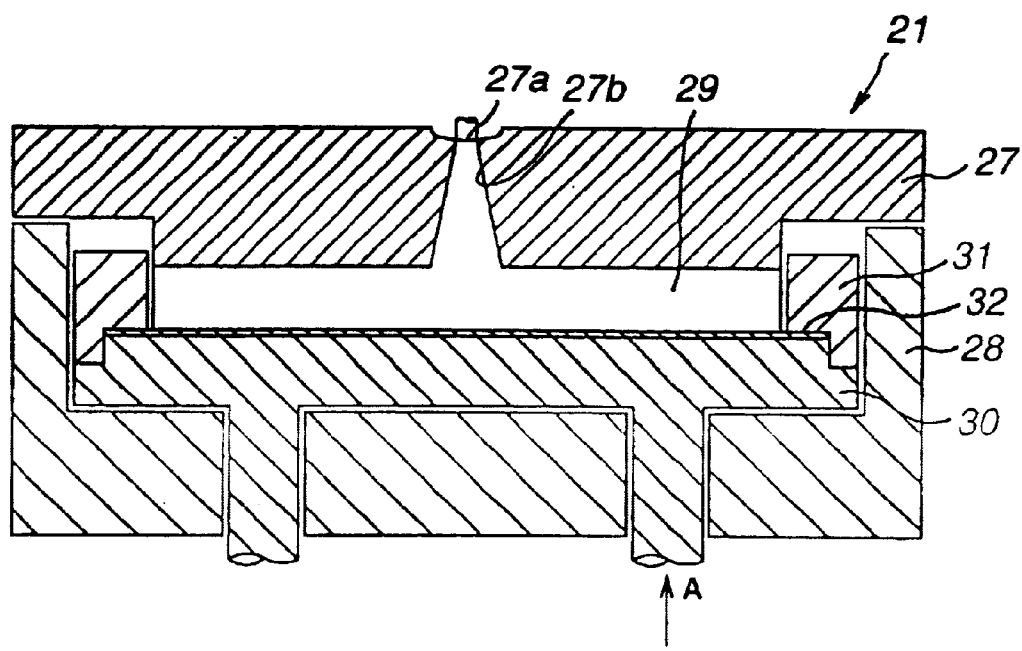
FIG. 8 is a sectional view of a mold used to manufacture the optical disc shown in FIG. 5.

The mold 21 used in the present invention is shown in detail in FIG. 8. It consists of a fixed mold 27 having an inlet 27a and nozzle 27b through which the resin is injected, a first movable mold 28 disposed opposite to the fixed mold 27 and which is moved toward and away from the fixed mold 27, a second movable mold 30 disposed inside a cavity 29 defined between the fixed mold 27 and first movable mold 28 when clamped and which is moved toward and away from the fixed mold 27, and an outer-peripheral ring 31 interlocked with the second movable mold 30.

As mentioned above, the first movable mold 28 is moved by the clamping cylinder 26 toward and away from the fixed mold 27.

The inlet 27a of the fixed mold 27 is connected to the heating cylinder 22 and the molten resin is injected from the inlet 27a. From the inlet 27a, the nozzle 27b is penetrated through the fixed mold 27. The molten resin is filled, by injection, into the cavity 29 through the nozzle 27b from the inlet 27a. The fixed mold 27 is stationary.

When the first movable mold 28 is clamped or closed to the fixed mold 27, the space between them provides the cavity 29. There is provided in the cavity 29 the second movable mold 30 which is freely movable toward and away from the fixed mold 27. The second movable mold 30 is moved by a hydraulic mechanism (not shown) independently of the first movable mold 28 in the direction of arrow A in FIG. 8. At this time, the outer-peripheral ring 31 is moved along the second movable mold 30. The second movable mold 30 has fixed to a side thereof opposing the fixed mold 27 a stamper 32 having formed thereon a predetermined pattern of lands and grooves corresponding to information signal, and so forth.

It should be noted that the first and second movable molds 28 and 30 have provided in the middle thereof a punching means (not shown) for forming a central hole in the disc substrate by gate cutting.

The outer-peripheral ring 31 is stepped along the inner circumference thereof for fitting onto the second movable mold 30. When the outer-peripheral ring 31 is put into contact with the fixed mold 27 as the second movable mold 30 is moved toward the fixed mold 27, it will cooperate with the fixed mold 27, second movable mold 30 and outer-peripheral ring 31 to define the cavity 29 in which the skin layer 7 of the substrate 2 is molded.

For manufacturing the substrate 2 used in the two-layered optical disc according to the present invention using the injection molding machine 20 having been described in the foregoing, first a resin is allowed to fall from the hopper 30 down into the heating cylinder 22 owing to its own weight, and the resin is fed along the groove of the screw 25 to the end of the heating cylinder 22 while being kneaded by the screw 25 being rotated. For this while, the resin is headed by the heater (not shown) around the beating cylinder 22 and also heated internally by a frictional heat caused by the kneading, thus resulting in a molten resin.

Figure 9:
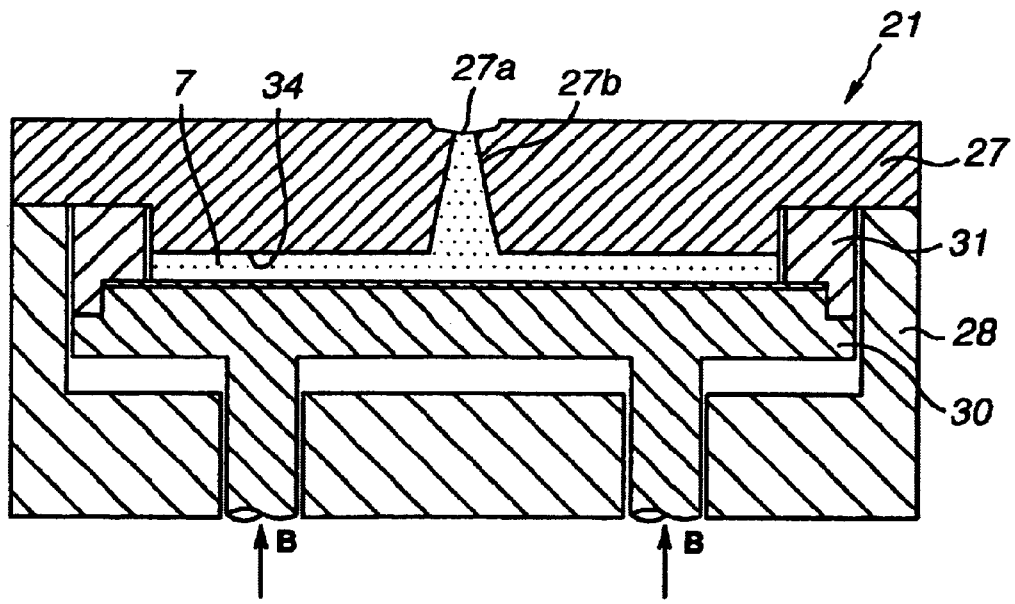
FIG. 9 is a sectional view of the mold, showing the mold geometry in the step of forming a skin layer in the process of manufacturing the substrate for the optical disc according to the present invention.

The second movable mold 30 is moved by the hydraulic cylinder (not shown) in the direction of arrow B in FIG. 9 to a position where the outer-peripheral ring 31 interlocked with the second movable mold 30 contacts with the fixed mold 27. The second movable mold 30, fixed mold 27 and outer-peripheral ring 31 define together a cavity 34 in which the skin layer 7 is molded. It will be appreciated that a space taking place at this time between the second and first movable molds 30 and 28 is void.

Next, an injection force is applied by the hydraulic cylinder 24a to the screw 25 which will thus force the resin at the end of the heating cylinder 22 from the heating cylinder 22 for injection, under a high pressure, into the cavity 34 via the nozzle 27b of the fixed mold 27.

Then the fixed mold 27, first and second movable molds 28 and 30, and the outer-peripheral ring 31 are cooled by a thermoregulator (not shown) provided at the mold 21, so that the resin inside the cavity 34 is cooled and hardened to mold the skin layer 7 having a predetermined pattern of lands and grooves formed on the surface thereof.

Figure 10:
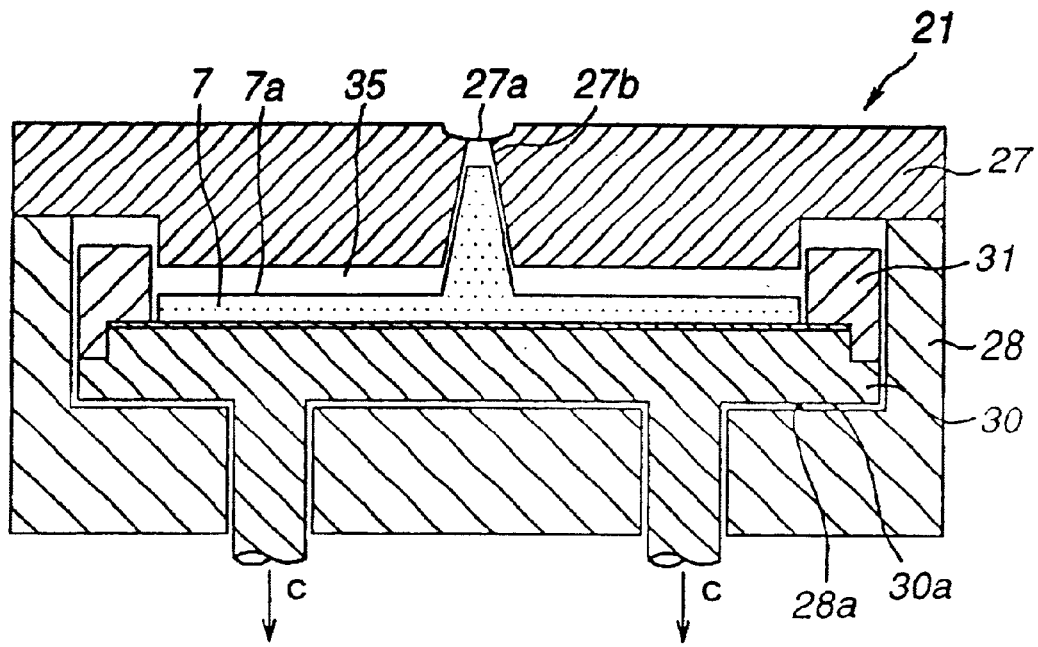
FIG. 10 is a sectional view of the mold, showing the mold geometry in the step of defining a cavity for the core layer by moving the molded skin layer along with a second movable mold.

Next, the filled resin is solidified at a temperature below the glass-transition point to form the skin layer 7. Thereafter, the second movable mold 30 is moved by a hydraulic cylinder (not shown) in the direction of arrow C to mount a bottom 30a of the second movable mold 30 onto an inner bottom 28a of the first movable mold 28 as shown in FIG. 10. At this time, air is blown in from only the fixed mold 27 to allow the molded skin layer 7 securely with the second movable mold 30 (mold releasing).

As shown in FIG. 10, an upper surface 7a of the skin layer 7, fixed mold 27 and outer-peripheral ring 31 will define a cavity 35 in which a core layer is to be molded.

Next, a resin having a higher flexural modulus than the resin used to mold the skin layer 7 is filled into the cavity 35 by injection through the nozzle 27b in a similar manner to that for the skin layer 7.

Figure 11:
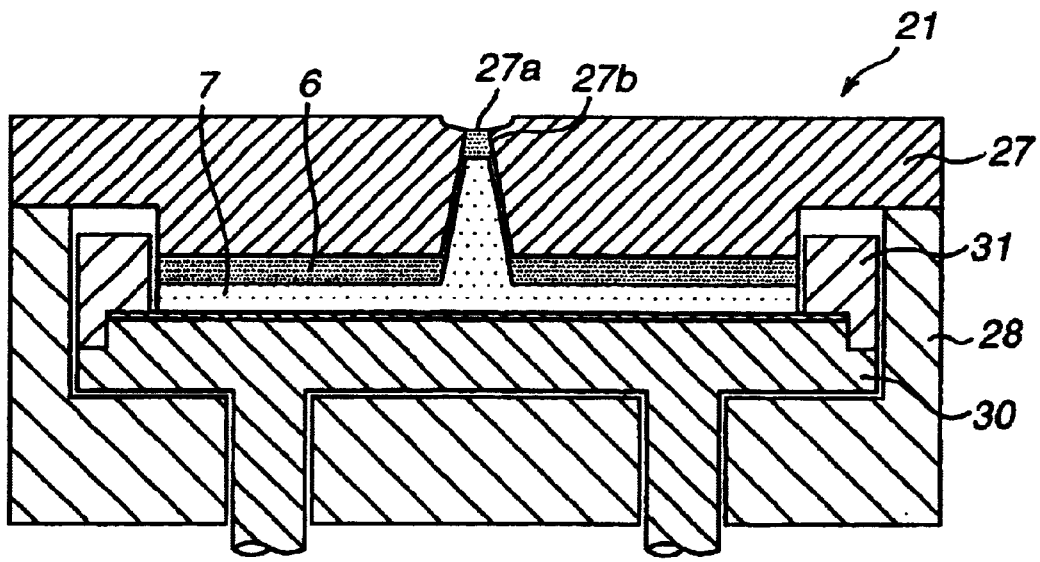
FIG. 11 is a sectional view of the mold, showing the mold geometry in the step of forming a core layer in the process of manufacturing the substrate for the optical disc according to the present invention.

As shown in FIG. 11, the fixed mold 27, first movable mold 28, second movable mold 30 and outer-peripheral ring 31 are cooled by the thermoregulator provided at the mold 21 so that the resin in the cavity 34 is cooled and hardened to form a core layer 6.

Next, the punching means (not shown) is used to form a central hole in the middle of the molded skin and core layers 7 and 6.

Figure 12:
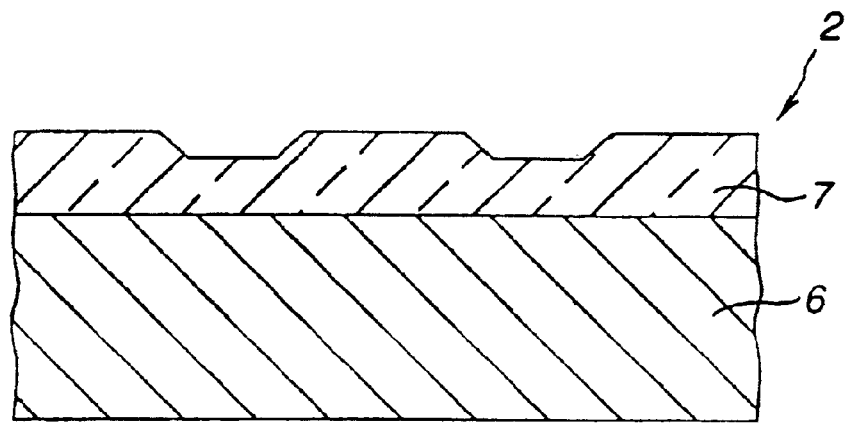
FIG. 12 is a sectional view of a substrate molded following the molding steps in FIGS. 9 to 11.

Then, the clamping cylinder 26 drives the second movable mold 30 and first movable mold 28 to move in an interlocked relation to open them from each other, and a stripping mechanism (not shown) takes out the two-layered substrate 2 shown in FIG. 12.

Next, a reflective layer 3 of Al alloy and a recording layer 4 of a phase-change material such as Ge—Sb—Te alloy or the like are formed in this order on the molded substrate 2 by sputtering.

Finally, an ultraviolet-curable resin is applied to the recording layer 4 by spin coating and then irradiated with ultraviolet rays to form a transparent layer 5, thereby producing the two-layered optical disc 1 shown in FIG. 5.

It will be appreciated that a multi-layered optical disc having a substrate of three or more layers can be produced by repeating the aforementioned steps of resin injection and cooling.

As having been discussed in the foregoing, in the method of manufacturing the optical disc 1 according to the present invention, the two-color molding is adopted to mold the skin layer 7 on the signal recording surface side, and a resin having a higher flexural modulus than the resin for the skin layer 7 is used to mold a core layer 6 on the skin layer, thereby forming the aforementioned substrate 2. Therefore, the optical disc manufacturing method according to the present invention permits to manufacture an optical disc 1 including a substrate 2 of which the strength is increased by a core layer 6 and which thus has a totally increased strength against deformations such as warpage and sink as well as an excellent reliability.

The substrate 2 can be molded by any ordinary two-color molding. However, the method according to the present invention can manufacture the substrate 2 very efficiently because the skin and core layers 7 and 6 are molded in a same mold 21.

Next, the method of manufacturing the sandwich type optical disc previously described with reference to FIG. 6 will be described herebelow.

Figure 13:
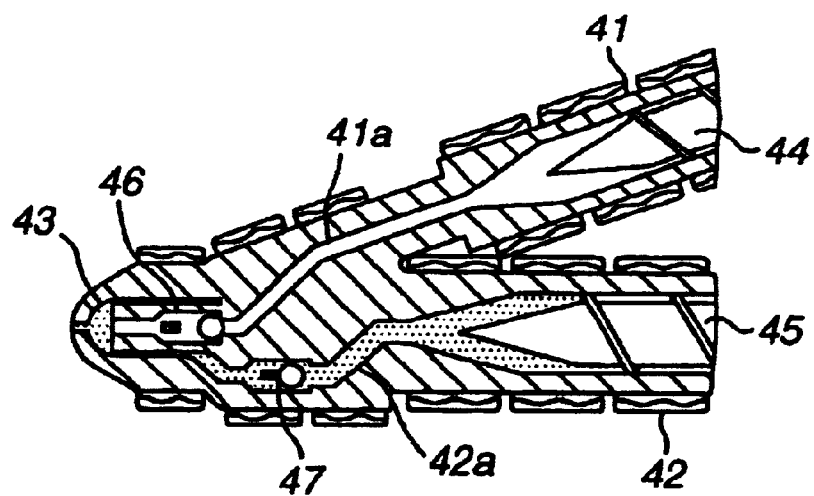
FIG. 13 is a sectional view, enlarged in scale, of a heating cylinder used in the injection molding machine to form the substrate for the optical disc according to the present invention.

An injection molding machine used to produce the substrate 11 of the sandwich type optical disc shown in FIG. 6 uses a heating cylinder to inject a molten resin into a mold and which consists of a pair of cylinders as shown in FIG. 13. The rest of the injection molding machine except for the heating cylinder is similar to that of the conventional injection molding machine.

More particularly, the injection molding machine used for manufacturing the optical disc according to the present invention has a pair of heating cylinders 41 and 42 through which two different resins are injected, as shown in FIG. 13. The heating cylinders 41 and 42 have formed therein resin paths 41a and 42a, respectively, through which the resin from the hopper is passed. Injection controllers 46 and 47 to control the amount of injected resin are connected to the ends of these resin paths 41a and 42a, respectively. In addition, there is provided at the ends of the injection controllers 46 and 47 a coupling 43 to connect the resin paths 41a and 42a to each other. The coupling 43 is connected to the nozzle 51 of the mold 50 in the conventional molding machine.

The substrate 11 for the sandwich type optical disc is produced using the aforementioned injection molding machine in any of the two methods. In one of these methods, two different resins are injected simultaneously but at different speeds, respectively. In the other method, two different resins are injected at a same injection speed but with a time delay between them.

In the first method, a resin for the core layer is injected from a hopper (not shown) into the heating cylinder 41, and fed to the injection controller 46 of the heating cylinder 41 by the screw 44 incorporated in the heating cylinder 41. Similarly, a resin for the skin core is injected from a hopper (not shown) into the heating cylinder 42, and fed to the injection controller 47 of the heating cylinder 42 by the screw 45 provided inside the heating cylinder 42.

Then, the resins for the core and skin layers, respectively, are injected by screws 44 and 45 from the respective heating cylinders 41 and 42 into the mold 50. At this time, however, the injection controllers 46 and 47 control the injection speeds such that the resin for the skin layer is injected at a slower speed from the heating cylinder 42 than the resin for the core layer injected from the heating cylinder 41.

Thus, a resin 52 for the skin layer and a resin 53 for the core layer are injected into the mold 50 in such a manner that the skin-core resin 52 forces out the core-layer resin 53. As the result, the skin-core resin 52 will be distributed in contact with the mold 50 while the core-layer resin 53 will be distributed inside the skin-core resin 52 as will be seen from FIG. 14.

Figure 15:
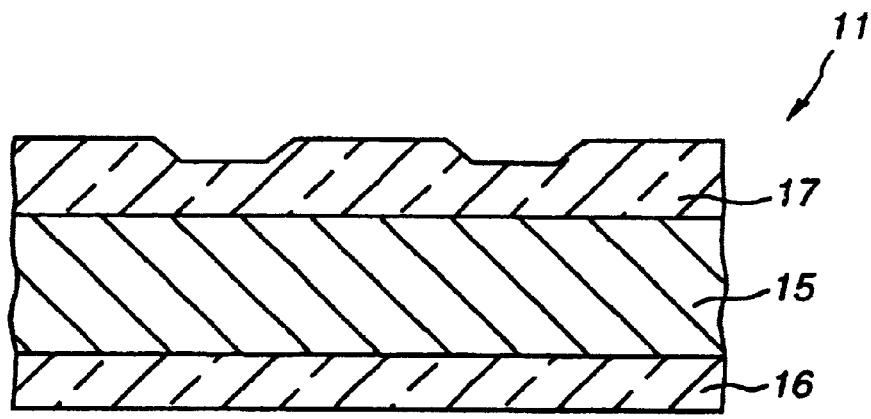
FIG. 15 is a sectional view of the substrate for the optical disc according to the present invention.

Then, the mold 50 is cooled by a thermoregulator (not shown) incorporated in the mold 50 itself so that the skin-layer and core-layer resins 52 and 53 filled in the mold 50 will be cooled and hardened. Finally, after the mold 50 is opened, the disc substrate 11 shown in FIG. 15 is removed by a disc stripping means (not shown).

Next, the second method will be described. Of this method, the process up to the feeding of the core-layer and skin-layer resins through the heating cylinders 41 and 42, respectively, to the injection controllers 46 and 47 is similar to that in the above-mentioned first method.

Thereafter, the injection controller 47 is operated to control the time length and amount of injection in order to inject the skin-layer resin into the mold 50 for a short time, namely, make a short shot of the resin.

Figure 14:
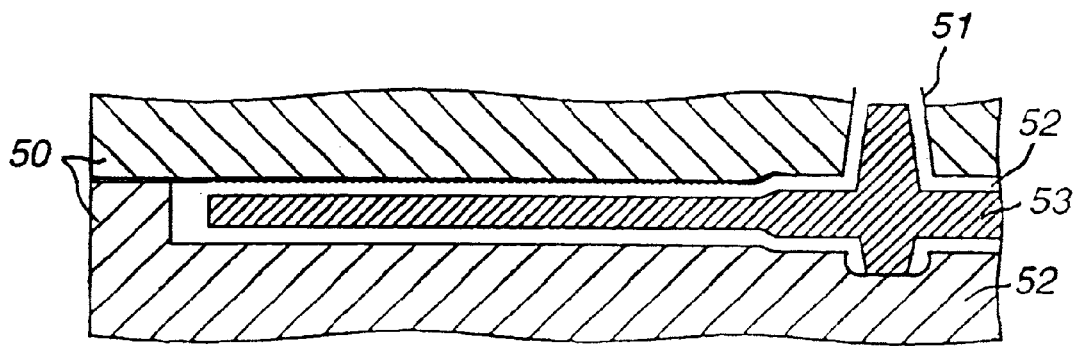
FIG. 14 is a sectional view, enlarged in scale, of the mold, showing the mold geometry when the substrate for the optical disc according to the present invention is formed in the mold.

Then, while the resin for the skin core is still in the slush state, the injection controller 46 is operated to control the amount of injection for injection of the core-layer resin. At this time, since the inner portion of the skin-layer resin is hardly cooled and thus still in the slush state, the core-layer resin will force out the inner portion of the skin-layer resin for injection into the mold. Subsequently, a process as in the first method will also take place as shown in FIG. 14.

Figure 16:
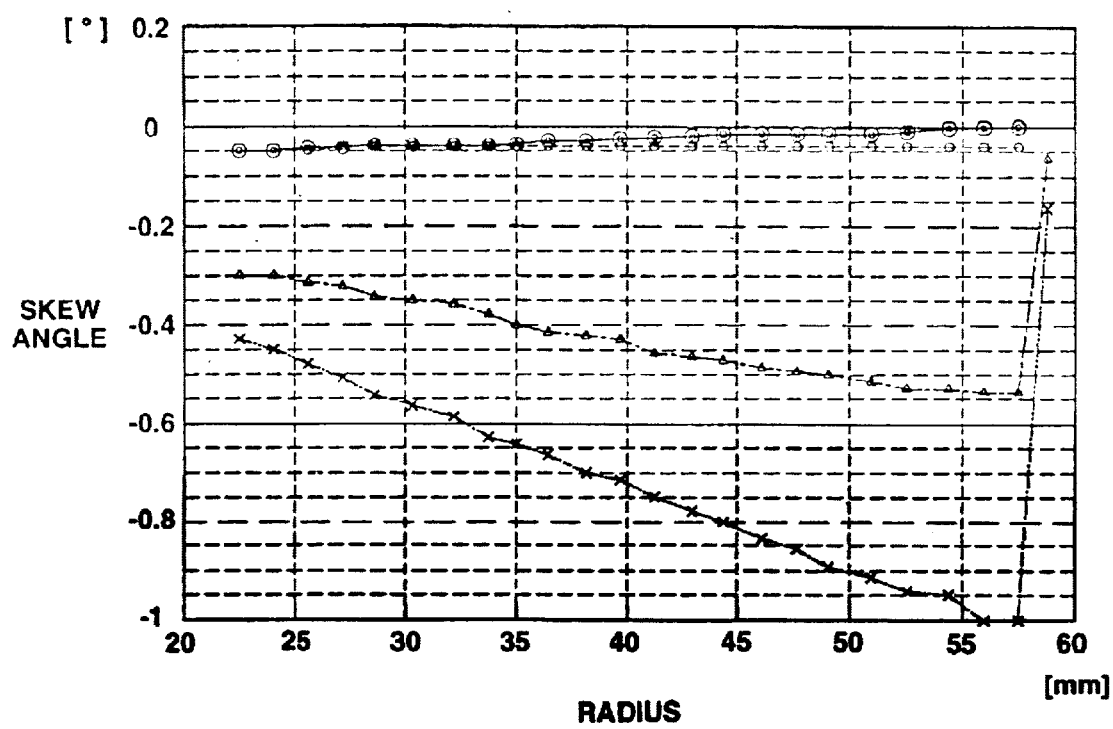
FIG. 16 is a graph showing the results of physical property evaluation effected on embodiments 1 to 10 and an comparative example 1.

Finally, the injected resins are cooled to result in a sandwich type substrate 11 shown in FIG. 16 in the second method as well.

In the second method, because of the short shot of the skin-layer resin, sink and poor stamping will possibly take place. To avoid this, however, the core-layer resin will be distributed inside the core-layer resin to increase the internal pressure to improve the stamping on the skin core.

Embodiments

The results of tests conducted on the embodiments of the present invention will be described herebelow.

To evaluate the strength and durability improvements of the two-layered and sandwich type optical discs according to the present invention in comparison with a conventional optical disc having a single-layer substrate, optical discs which will be discussed below were prepared and subjected to physical property tests which will also be described below.

Embodiment 1

A sandwich type optical disc was prepared as in the following. The following materials were prepared for the skin and core layers, respectively:

| <Material for skin layer> | |
| --- | --- |
| Resin | Polycarbonate (by Teijin) |
| Grade | AD-9000TG |
| Glass-transition point | 145° C. |
| Flexural modulus | 24,000 kgf/cm$^2$ |
| Water absorption | 0.3% |
| <Materials for core layer> | |
| Resin | Polycarbonate (by Teijin) |
| Grade | AD-5503 |
| Filler | Talc powder in 20% by weight |

The flexural modulus of the core layer was 40,000 kgf/cm$^2$. Namely, the core-layer resin showed an increased flexural modulus and thus an increased strength owing to the addition of the filler to the resin.

The aforementioned first method was employed to inject these skin- and core-layer resins simultaneously but at different speeds in the injection molding machine having the pair of heating cylinders as shown in FIG. 13 and mold a sandwich type substrate of 0.6 mm in thickness under the following conditions.

The molding conditions for this molding were as follows:

| | |
|---|---|
| Temperature of fixed and movable molds | 120 to 135° C. |
| Temperature of skin- and core-layer resins | 350° C. |
| Injection speeds: | |
| Skin-layer resin | 140 mm/sec averaged |
| Core-layer resin | 160 mm/sec averaged |
| Mold cooling time | 8 sec |
| Stamper depth | 80 mn |
| Track pitch | 0.7 to 0.85 μm |

Embodiment 2

As filler for the core layer, a mica powder in 20% by weight was used in place of the talc powder. The other materials were the same as in the embodiment 1. A sandwich type disc substrate was molded in the same manner as in the embodiment 1. The flexural modulus of the core layer was 61,000 kgf/cm$^2$.

Embodiment 3

As filler for the core layer, a powder of glass plate in 10% by weight was used in place of the talc powder. The other materials were the same as in the embodiment 1. A sandwich type disc substrate was molded in the same manner as in the embodiment 1. The flexural modulus of the core layer was 34,000 kgf/cm$^2$.

Embodiment 4

For the skin layer, the following material was used. The other materials were the same as in the embodiment 1. A sandwich type disc substrate was molded in the same manner as in the embodiment 1. The flexural modulus of the core layer was 40,000 kgf/cm$^2$.

| <Material for skin layer> | |
|---|---|
| Resin | ZEONEX (by Nihon Zeon) |
| Grade | E48R |
| Glass-transition point | 140° C. |
| Flexural modulus | 25,000 kgf/cm$^2$ |
| Water absorption | Less than 0.01% |

Embodiment 5

Similar skin-layer and core-layer materials to those in the embodiment 1 were used and the aforementioned second injection molding method was employed to mold a sandwich type disc substrate of 0.6 mm in thickness under the following conditions.

More particularly, the skin-layer materials were injected into the mold by short shot. The injected skin-layer material was cooled in air for 0.2 to 2.0 sec until its outer portion was hardened. Thereafter, the core-layer material was injected. Thus a sandwich type substrate was molded.

| | |
|---|---|
| Temperature of fixed and movable molds | 120 to 135° C. |
| Temperature of skin- and core-layer resins | 350° C. |
| Injection speeds: | |
| Skin-layer resin | 140 mm/sec averaged |
| Core-layer resin | 140 mm/sec averaged |
| Mold cooling time | 14 sec (including air-cooling time after only skin-layer resin was injected) |

The flexural modulus of the core layer was 40,000 kgf/cm$^2$.

Embodiment 6

As filler for the core layer, a mica powder in 20% by weight was used in place of the talc powder. The other materials were the same as in the embodiment 5. A sandwich type disc substrate was molded in the same manner as in the embodiment 5. The flexural modulus of the core layer was 61,000 kgf/cm$^2$.

Embodiment 7

As filler for the core layer, a powder of glass plate in 10% by weight was used in place of the talc powder. The other materials were the same as in the embodiment 5. A sandwich type disc substrate was molded in the same manner as in the embodiment 5. The flexural modulus of the core layer was 34,000 kgf/cm$^2$.

Embodiment 8

For the skin layer, ZEONEX as in the embodiment was used in place of polycarbonate. The other materials were the same as in the embodiment 4. A sandwich type disc substrate was molded in the same manner as in the embodiment 5. The flexural modulus of the core layer was 40,000 kgf/cm$^2$.

COMPARATIVE EXAMPLE 1

The conventional injection molding machine was used to mold a disc substrate of 0.6 mm in thickness from polycarbonate.

The flexural modulus of the disc substrate thus produced was measured. The results of measurement were compared with the results of tests on the above-mentioned embodiments 1 to 8. The comparison results are shown in Table 1.

TABLE 1

| | Materials for disc substrate | | Molding method | Flexural modulus of disc substrate after molding (kgf/cm²) |
|---|---|---|---|---|
| | Skin layer | Core layer | | |
| Embodiment 1 | Polycarbonate | Polycarbonate plus talc powder (in 20%) | First method | 32,000 |
| Embodiment 2 | Polycarbonate | Polycarbonate plus mica powder (in 20%) | First method | 51,000 |
| Embodiment 3 | Polycarbonate | Polycarbonate plus glass-plate powder (in 10%) | First method | 29,000 |
| Embodiment 4 | ZEONEX | Polycarbonate plus talc powder (in 20%) | First method | 34,000 |
| Embodiment 5 | Polycarbonate | Polycarbonate plus talc powder (in 20%) | Second method | 32,000 |
| Embodiment 6 | Polycarbonate | Polycarbonate plus mica powder (in 20%) | Second method | 54,000 |
| Embodiment 7 | Polycarbonate | Polycarbonate plus glass-plate powder (in 10%) | Second method | 29,000 |
| Embodiment 8 | ZEONEX | Polycarbonate plus talc powder (in 20%) | Second method | 34,000 |
| Comparative example 1 | Polycarbonate only | None | Conventional injection molding | 24,000 |

As seen from Table 1, the embodiments each having a substrate consisting of a skin layer formed on the signal recording surface side and a core layer formed from a material having a higher flexural modulus than the material for the skin layer are high in flexural modulus, that is, in rigidity and strength.

More particularly, the disc substrates in the embodiments 1 and 4 have a flexural modulus and strength both 1.3 times higher than that of the disc substrate in the comparative example 1.

The disc substrates in the embodiments 3, and 5 to 8 have a flexural modulus and strength both 1.75 times higher than that of the disc substrate in the comparative example 1. The test result of this embodiment 3 shows that a disc substrate having a flexural modulus of more than at least 29,000 kgf/cm² is stronger than a conventional disc substrate formed from only polycarbonate.

Further, the disc substrate in the embodiment 2 has a flexural modulus and strength both 2.1 times higher than that of the disc substrate in the comparative example 1.

Thus it has been proved that a disc substrate formed from a skin layer at the signal recording surface side and a core layer made of a material having a higher flexural modulus than the material of the skin layer can have an increased strength.

Embodiment 9

A sandwich type substrate of 1.2 mm in thickness was prepared similarly to the embodiment 5.

Embodiment 10

Next, a two-layered optical disc was prepared as in the following. Namely, the materials for the skin and core layers were the same as those in the embodiment 2. An injection molding machine using first and second movable molds was used to effect steps of injection and cooling for each of the layers.

More particularly, a cavity for a thickness of 0.6 mm was defined by the fixed mold, second movable mold and outer-peripheral ring as shown in FIG. 9, and the material for the skin layer was injected into the cavity. Then the injected material was cooled for about 4 sec.

Then the second movable mold was moved about 0.6 mm by the hydraulic cylinder (not shown) as shown in FIG. 10. Air was blown from the fixed mold side for mold releasing so that the molded skin layer could be positively moved along with the movable mold.

Next, the core-layer resin was injected and cooled as shown in FIG. 11 to form a two-layered substrate having a final thickness of 1.2 mm. The molding conditions were as follows:

| | |
|---|---|
| Temperature of fixed and movable molds | 110 to 130° C. |
| Temperature of skin- and core-layer resins | 350° C. |
| Injection speeds: | |
| Skin- and core-layer resins | 160 mm/sec averaged |
| Mold cooling time | 8 sec (including cooling time necessary for skin- and core-layer resins) |

Embodiment 11

Similar resins as those in the embodiment 2 were used for skin and core layers, and injection molding was repeatedly done using a similar injection molding machine to that in the embodiment 9 to form a first skin layer, core layer and a second skin layer in this order, thereby molding a three-layered substrate of 1.2 mm in thickness. The first skin layer has a thickness of 0.3 to 0.4 mm, the core layer had a thickness of 0.6 to 0.4 mm, and the second skin layer had a thickness of 0.3 to 0.4 mm.

| | |
|---|---|
| Temperature of fixed and movable molds | 110 to 130° C. |
| Temperature of skin- and core-layer resins | 350° C. |
| Injection speeds: | |
| Skin- and core-layer resins | 160 mm/sec averaged |

-continued

| | |
|---|---|
| Mold cooling time | 12 sec (including cooling time necessary for first and second skin-layer and core-layer resins) |

COMPARATIVE EXAMPLE 2

Similarly to the comparative example 1, a substrate of 1.2 mm in thickness was molded from polycarbonate.

Optical discs produced using the substrates in the embodiments 9 to 11 and comparative example 2, having been prepared as mentioned above, were evaluated concerning their durability as in the following.

First, an aluminum film and protective layer were formed in this order on each of the substrates in the embodiments 9 to 11 and comparative example 2. The substrates were used to produce optical discs, respectively.

Next, these optical discs were checked for radial warpage. Thereafter, the optical pieces were left in air at a temperature of 60° C. and humidity of 90% for 96 hours. Then they were checked for radial warpage again.

The test results are shown in FIG. 16 in which the horizontal axis indicates the radial position of the optical disc while the vertical axis indicates the skew angle of the optical disc.

Note that in FIG. 16, the marks ⊚ indicate averaged status of the optical discs in the embodiments 9 to 11, the marks ○ indicate the averaged status of the optical discs in the embodiments 9 to 11 after left in air at the above-mentioned high temperature and humidity for 96 hours, the marks Δ indicate the status of the optical disc in the comparative example 2, and the marks X indicate the status of the optical disc in the comparative example 2 after left in air at the above-mentioned high temperature and humidity for 96 hours.

Therefore, the test results shown in FIG. 16 prove that the embodiments 9 to 11 in which the substrate is molded from a skin layer formed on the signal recording surface side and a core layer formed from a material having a higher flexural modulus than the material of the skin layer shows a higher strength than the comparative example 2 in which the single-layer substrate is molded from polycarbonate in the conventional method of injection molding, and also they are hardly subjected to deformations such as warpage and sink.

Even after being left at the high temperature and humidity for the long time, the disc substrates in the embodiments 9 to 11 showed no deformation and thus an excellent durability. On the contrary, the comparative example using a conventional optical disc showed a considerable deformation and a deteriorated surface condition after left at the high temperature and humidity for the long time.

As having been described in the foregoing, since the substrate of the optical recording medium according to the present invention is comprised of the first resin layer forming the surface of the substrate on which the recording layer is formed, and the second resin layer formed from the resin having the higher flexural modulus, namely, a higher rigidity, than the resin of the first resin layer, the substrate has an increased strength to minimize the deformation of the substrate. Namely, the optical recording medium according to the present invention is enhanced in strength, thus hardly subject to deformations and has an outstanding durability. The optical recording medium of the present invention is thus highly reliable.

Further, in the optical recording medium of the present invention, the first resin layer forming the surface of the substrate on which the recording layer is formed is formed from the resin having the smaller rigidity, namely, a better fluidity, than the second resin layer. Therefore, the first resin layer has an excellent stampability, and thus the substrate has a superior stampability. Therefore, the optical recording medium of the present invention is capable of a high density recording.

As having also been described in detail in the foregoing, the optical recording medium manufacturing method according to the present invention can produce a substrate by two-color molding steps of forming a first resin layer at least on a side of the substrate on which the recording layer is formed, and a second resin layer on the first resin layer from a resin having a higher flexural modulus, namely, a higher rigidity, than the resin of the first resin layer. Therefore, the substrate thus molded has an increased strength and thus is hardly subject to deformations. As the result, the method according to the present invention can be used to manufacture an optical recording medium enhanced in strength, thus hardly subject to deformations such as warpage, sink, and so forth and having an outstanding durability. Namely, the method according to the present invention can provide a highly durable and reliable optical disc.

Further, in the method according to the present invention, the first resin layer forming the surface of the substrate on which the recording layer is formed is formed, from the resin having the smaller rigidity, namely, a better fluidity, than the second resin layer. Therefore, the first resin layer has an excellent stampability, and thus the substrate has a superior stampability. Namely, the method according to the present invention can be used to produce an optical disc capable of a high recording.

Also, the method according to the present invention permits to mold the first and second resin layers of a disc substrate can be formed in a same mold. Therefore, an optical disc can be manufactured more easily and efficiently, so that the manufacturing process can be simplified and the manufacturing costs can be considerably reduced.

What is claimed is:

1. An optical recording medium including a substrate, and a reflective layer, a recording layer and a transparent layer formed in this order on the substrate, a light being incident from the transparent layer to write and/or read information signal, the substrate comprising:

a first resin layer forming a surface of the substrate on which the reflective layer is formed;

a second resin layer formed on the first resin layer having a higher flexural modulus than the first resin layer, a first dielectric layer is located between the reflective layer and the recording layer, and a second dielectric layer is located between the recording layer and the transparent layer, to control the optical and thermal characteristics of the optical disc.

2. The optical disc according to claim 1, wherein the substrate further comprises:

a third resin layer formed on a surface opposing to the surface on which the first resin layer is formed and made from the same resin as that of the first resin layer.

3. The optical disc according to claim 1, wherein the flexural modulus of the resin of the second resin layer is 29,000 kgf/cm$^2$ or more.

4. The optical disc according to claim 1, wherein the resin of the second resin layer has a higher hardness and a higher rigidity than the first resin layer.

5. The optical disc according to claim 1, wherein the resin of the second resin layer comprises a resin which additionally contains a suitable amount of at least one of a heterogeneous resin, fibers, fillers, talc powder, mica powder, and carbon fillers, added to provide a flexural modulus of at least 29,000 kgf/cm$^2$.

6. An optical disc, comprising:
a substrate, said substrate including a core layer and a skin layer, said skin layer being located on said core layer;
a reflective layer;
a recording layer; and
a transparent layer;
wherein a first dielectric layer is located between the reflective layer and the recording layer, and a second dielectric layer is located between the recording layer and the transparent layer, to control the optical and thermal characteristics of the optical disc.

7. The optical disc according to claim 6, wherein the resin of said core layer has a higher hardness and a higher rigidity than the skin layer.

8. The optical disc according to claim 6, wherein the core layer comprises a resin having at least one of heterogeneous resins, fibers, fillers, talc powder, mica powder, and carbon fillers, added to provide a flexural modulus of at least 29,000 kgf/cm$^2$.

9. An optical recording medium including a substrate, and a reflective layer, a recording layer and a transparent layer formed in this order on the substrate, a light being incident from the transparent layer to write and/or read information signal, the substrate comprising:
a first resin layer forming a surface of the substrate on which the reflective layer is formed;
a second resin layer formed on the first resin layer having a higher flexural modulus than the first resin layer; and
a third resin layer formed on a surface opposing to the surface on which the first resin layer is formed and made from the same resin as that of the first resin layer.

10. An optical recording medium including a substrate, and a reflective layer, a recording layer and a transparent layer formed in this order on the substrate, a light being incident from the transparent layer to write and/or read information signal, the substrate comprising:
a first resin layer forming a surface of the substrate on which the reflective layer is formed; and
a second resin layer formed on the first resin layer having a higher flexural modulus than the first resin layer,
wherein the flexural modulus of the resin of the second resin layer is 29,000 kgf/cm$^2$ or more.

11. An optical recording medium including a substrate, and a reflective layer, a recording layer and a transparent layer formed in this order on the substrate, a light being incident from the transparent layer to write and/or read information signal, the substrate comprising:
a first resin layer forming a surface of the substrate on which the reflective layer is formed; and
a second resin layer formed on the first resin layer having a higher flexural modulus than the first resin layer,
wherein the resin of the second resin layer comprises a resin which additionally contains a suitable amount of at least one of a heterogeneous resin, fibers, fillers, talc powder, mica powder, and carbon fillers, added to provide a flexural modulus of at least 29,000 kgf/cm$^2$.

12. A method of manufacturing, by injection molding, an optical recording medium including a substrate, a recording layer and a light transparent layer, a light being incident from the light transparent layer to write and/or read an information signal, the substrate being formed by two-color molding steps of:
forming a first resin layer at least on a side of the substrate on which the recording layer is formed; and
forming a second resin layer on the first resin layer from a resin having a higher flexural modulus than the resin of the first resin layer.

13. The method according to claim 12, wherein the two-color molding is done in a same mold.

14. The method according to claim 12, wherein the first resin layer is formed and then the second resin layer is formed on the first resin layer.

15. The method according to claim 12, wherein the resin for the first resin layer injected into a mold at a slower speed than the resin for the second layer, whereby the resins for the first and second resin layers, respectively, are injected simultaneously into the same mold.

16. The method according to claim 12, wherein the resin for the first resin layer is injected into a mold and then the resin for the second resin layer is injected into the same mold while at least a part of the resin for the first resin layer is still in the slush state.

17. An optical disc, comprising:
a substrate;
a reflective layer;
a recording layer; and
a transparent layer; wherein
said substrate includes a core layer and a skin layer, said skin layer formed on a side of the substrate on which the reflective layer is formed, said core layer formed on a side of the substrate opposite to the reflective layer and having a higher flexural modulus than the resin of the skin layer,
wherein the resin of the core layer comprises a resin which additionally contains a suitable amount of at least one of heterogeneous resins, fibers, fillers, talc powder, mica powder, and carbon fillers, added to provide a flexural modulus of at least 29,000 kgf/cm$^2$.

18. An optical disc, comprising:
a substrate;
a reflective layer;
a recording layer; and
a transparent layer; wherein
said substrate includes a core layer and a skin layer, said skin layer formed on a side of the substrate on which the reflective layer is formed, said core layer formed on a side of the substrate opposite to the reflective layer and having a higher flexural modulus than the resin of the skin layer,
wherein the resin for the core layer has a flexural modulus of 29,000 kgf/cm$^2$ or more.

19. An optical disc, comprising:
a substrate;
a reflective layer;
a recording layer; and
a transparent layer; wherein
said substrate includes a core layer and a skin layer, said skin layer formed on a side of the substrate on which the reflective layer is formed, said core layer formed on a side of the substrate opposite to the reflective layer and having a higher flexural modulus than the resin of the skin layer,
wherein the resin for the core layer has a flexural modulus of 34,000 kgf/cm$^2$ or more.

20. An optical disc, comprising:

a substrate;

a reflective layer;

a recording layer; and a transparent layer;

wherein said substrate includes a core layer and a first skin layer, said skin layer formed on a side of the substrate on which the reflective layer is formed, said core layer formed on a side of the substrate opposite to the reflective layer and having a higher flexural modulus than the resin of the skin layer a second skin layer formed on a surface of the substrate opposite to that on which the first skin layer is formed.

21. The optical disc according to claim 20, wherein the second skin layer is made from the same resin as that of the first skin layer.

22. An optical disc, comprising:

a substrate;

a reflective layer;

a recording layer; and a transparent layer;

wherein said substrate includes a core layer and a skin layer, said skin layer formed on a side of the substrate on which the reflective layer is formed, said core layer formed on a side of the substrate opposite to the reflective layer and having a higher flexural modulus than the resin of the skin layer, wherein a first dielectric layer is located between the reflective layer and the recording layer, and a second dielectric layer is located between the recording layer and the transparent layer, to control the optical and thermal characteristics of the optical disc.

23. The optical disc according to claim 22, wherein the resin of the core layer has a higher hardness and a higher rigidity than the skin layer.

24. The optical disc according to claim 22, wherein the resin of the core layer comprises a resin which additionally contains a suitable amount of at least one of heterogeneous resins, fibers, fillers, talc powder, mica powder, and carbon fillers, added to provide a flexural modulus of at least 29,000 kgf/cm$^2$.

25. The optical disc according to claim 22, wherein the resin of the core layer has a higher hardness and a higher rigidity than the skin layer.

26. The optical disc according to claim 22, wherein the resin of the core layer comprises a resin which additionally contains a suitable amount of at least one of heterogeneous resins, fibers, fillers, talc powder, mica powder, and carbon fillers, added to provide a flexural modulus of at least 29,000 kgf/cm$^2$.

27. An optical disc, comprising:

a substrate;

a reflective layer;

a recording layer; and a transparent layer;

said substrate includes a core layer and a skin layer, said skin layer formed on a side of the substrate on which the reflective layer is formed, said core layer formed on a side of the substrate opposite to the reflective layer and having a higher flexural modulus than the resin of the skin layer, wherein a first dielectric layer is located between the reflective layer and the recording layer, and a second dielectric layer is located between the recording layer and the transparent layer, to control the optical and thermal characteristics of the optical disc.

* * * * *